United States Patent [19]
Ito et al.

[11] Patent Number: 5,337,195
[45] Date of Patent: Aug. 9, 1994

[54] RECORDING CONTROL APPARATUS FOR USE WITH TAPE RECORDER

[75] Inventors: Masayuki Ito; Takami Makada, both of Chofu, Japan

[73] Assignee: Otari, Inc., Chofu, Japan

[21] Appl. No.: 754,980

[22] Filed: Sep. 4, 1991

[30] Foreign Application Priority Data

Sep. 7, 1990 [JP] Japan ................ 2-238468

[51] Int. Cl.⁵ ............................................. G11B 5/02
[52] U.S. Cl. ................................. 360/27; 360/15
[58] Field of Search ............ 360/27, 13, 15, 51, 360/62, 46

[56] References Cited

U.S. PATENT DOCUMENTS

| | | | |
|---|---|---|---|
| 2,963,685 | 12/1960 | Laurer et al. | 360/27 |
| 4,630,137 | 12/1986 | Sakiguchi | 360/13 |
| 4,633,337 | 12/1986 | Horie et al. | 360/62 |
| 4,847,710 | 7/1989 | Morioka et al. | 360/27 |
| 4,977,469 | 12/1990 | Yokozawa | 360/13 |
| 5,164,862 | 11/1992 | Kawamata | 360/27 |

FOREIGN PATENT DOCUMENTS 224483 12/1983 Japan .

Primary Examiner—Robert J. Pascal
Assistant Examiner—Tan Dinh
Attorney, Agent, or Firm—Knobbe, Martens, Olson & Bear

[57] ABSTRACT

A recording control apparatus for use with a tape recorder. The apparatus comprises a recording circuit selectively activated; a clock generating means for generating control clock pulses that provide the basis for controlling the recording circuit; a counting means for counting the control clock pulses; a counter setting means for initializing the counting means; a recording circuit control means for controlling the recording circuit in accordance with the output of the counting means; and a control means for supplying the counter setting means with initial values from which to start the counting before predetermined points in time at which to start and stop recording. With time monitored by the clock generating and counting means, the burdens on the computer in its performance are alleviated.

4 Claims, 7 Drawing Sheets

PRIOR ART FLOWCHART

RECORDING CONTROL APPARATUS FOR USE WITH TAPE RECORDER

BACKGROUND OF THE INVENTION

1. Field of the Invention

The present invention relates to a recording control apparatus for use with a tape recorder incorporating a recording circuit. More particularly, the invention relates to a recording control apparatus allowing the tape recorder to make recordings at specific positions on a magnetic tape.

2. Description of the Prior Art

After a tape recorder records signals on a magnetic tape, it sometimes becomes necessary to replace part of the recorded signals with other signals. In such a case, the tape recorder is first placed in its reproduction mode and the tape is played back. When the desired part of the tape is reached, the recording circuit of the tape recorder is activated to record new signals where needed on the tape. After recording, the recording circuit is deactivated and the reproduction mode is again entered.

The above operations of the tape recorder are known to be performed either manually while the reproduced signals are being monitored or automatically by use of an automatic editing device.

Prior to using the conventional automatic editing device, it is necessary to record beforehand time information along the entire tape to be used. The time information has been standardized in the broadcasting industry as the time code. This is the information identifying absolute positions on the tape in its longitudinal direction. The standardized time code is a code that makes codes of the hour, minute and second, dividing the second into 30 parts, constituting a series of coded frames.

Where the tape with the time code recorded on it is to be edited by the conventional automatic editing device, the positions at which to start and end editing are first set on the device. After editing is started, the device reaches the editing start position. At that point, the device activates the recording circuit of the tape recorder to make recordings. When the editing end position is reached, the automatic editing device deactivates the recording circuit of the tape recorder.

FIG. 1 shows a typical prior art system that edits magnetic tapes based on the time code recorded thereon. This system, disclosed in Japanese Patent Laid-Open No. 58-224483, comprises a time code reading means 27 to read the time code from a tape 21, an editing time storing means 28, a recording circuit 25, a recording circuit control means 30, and a control means 29 to control these parts. An area 31 enclosed by a broken line constitutes a microprocessor.

In operation, as depicted in FIG. 2, the above system first sets and stores an editing time $T_1$. The system then reads a time code $T_2$ from the tape 21. The times $T_1$ and $T_2$ are compared, and the recording circuit is controlled accordingly. Thereafter, a check is made to see if the editing has come to an end. These steps are executed under a control program in the microprocessor 31.

One disadvantage of the prior art automatic recording apparatus that allows the tape recorder to edit tapes automatically is the difficulty in controlling editing over very short stretches of the tape or at exact tape positions, e.g., in units of one-thirtieth of a second. This makes it difficult to carry out precise editing of tapes.

The principal cause of the above problem is that the recording control apparatus is controlled by a microprocessor and its control program. To control the recording control apparatus with the microprocessor and its control program requires the control program to monitor the current tape position and the editing start position.

Generally, however, the control program has other tasks to take care of besides controlling tape editing. This leads to other disadvantages: that the processing time is not constant per unit amount of editing and that it takes time to edit the tape. Particularly in the flowchart of FIG. 2, it takes considerable time to carry out steps (1) and (2), step (1) reading the time code $T_2$, step (2) checking to see if the times $T_1$ and $T_2$ match. For this reason, when editing is conventionally controlled by the microprocessor and its control program, predetermined delays need to be provided for the positions at which to start and stop editing.

SUMMARY OF THE INVENTION

It is therefore an object of the present invention to provide a recording control apparatus of relatively simple construction which controls tape editing positions with high accuracy on a tape recorder.

In carrying out the invention, there is provided a recording control apparatus for use with a tape recorder, the apparatus comprising a recording circuit selectively activated; a clock generating means for generating control clock pulses that provide the basis for controlling the recording circuit; a counting means for counting the control clock pulses; a counter setting means for initializing the counting means; a recording circuit control means for controlling the recording circuit in accordance with the output of the counting means; and a control means for supplying the counter setting means with initial values from which to start the counting before predetermined points in time at which to start and stop recording.

In the above construction, the recording circuit may enter one of two modes, activated or deactivated mode.

The clock generating means generates a clock signal that specifies positions at which to edit recordings on the tape. In operation, a time code is reproduced from the tape, and the clock signal is extracted in synchronism with the reproduced time code.

The counting means counts as needed the clock pulses that are output by the clock generating means.

The counter setting means initializes the counting means. Given an initial value, the counting means counts the clock pulses accordingly. At the end of the counting, the counting means output a counting end signal.

The recording circuit control means controls the recording circuit as per the output of the counting means.

The control means determines an initial value such that the counting means will start its counting before a predetermined recording start time or recording stop time. The initial value is forwarded to the counter setting means.

As described, only the counting means and the recording circuit control means control the recording circuit during tape editing. All the control program has to do is to set an initial value to the counting means. Thus it becomes unnecessary for the control program to monitor the current tape position, the recording start position or the recording end position. This reduces the burdens on the control program, and allows tape editing to be performed with precise timing.

DESCRIPTION OF THE PREFERRED EMBODIMENT

Figure 1:
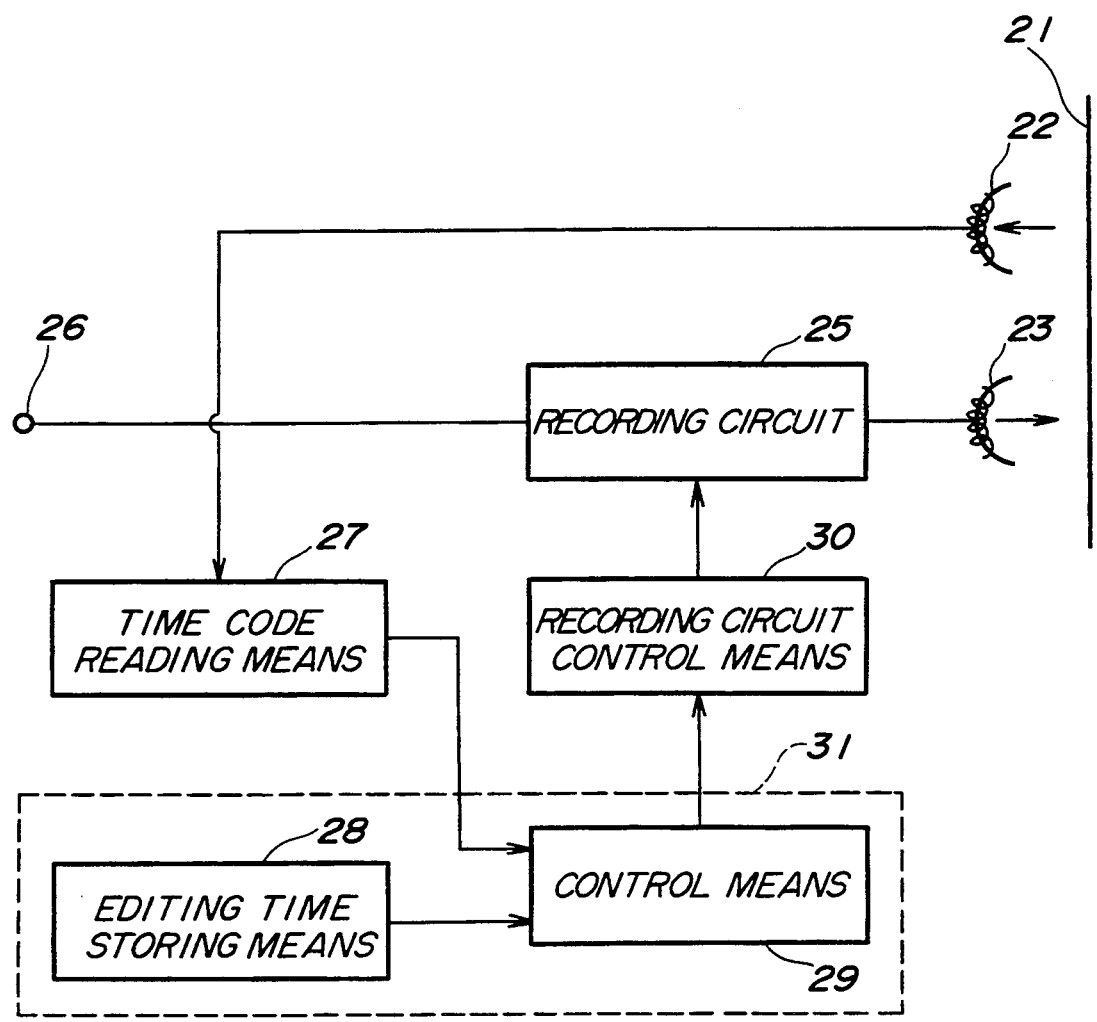
FIG. 1 is circuit block diagram of the typical prior art recording control apparatus.
Figure 2:
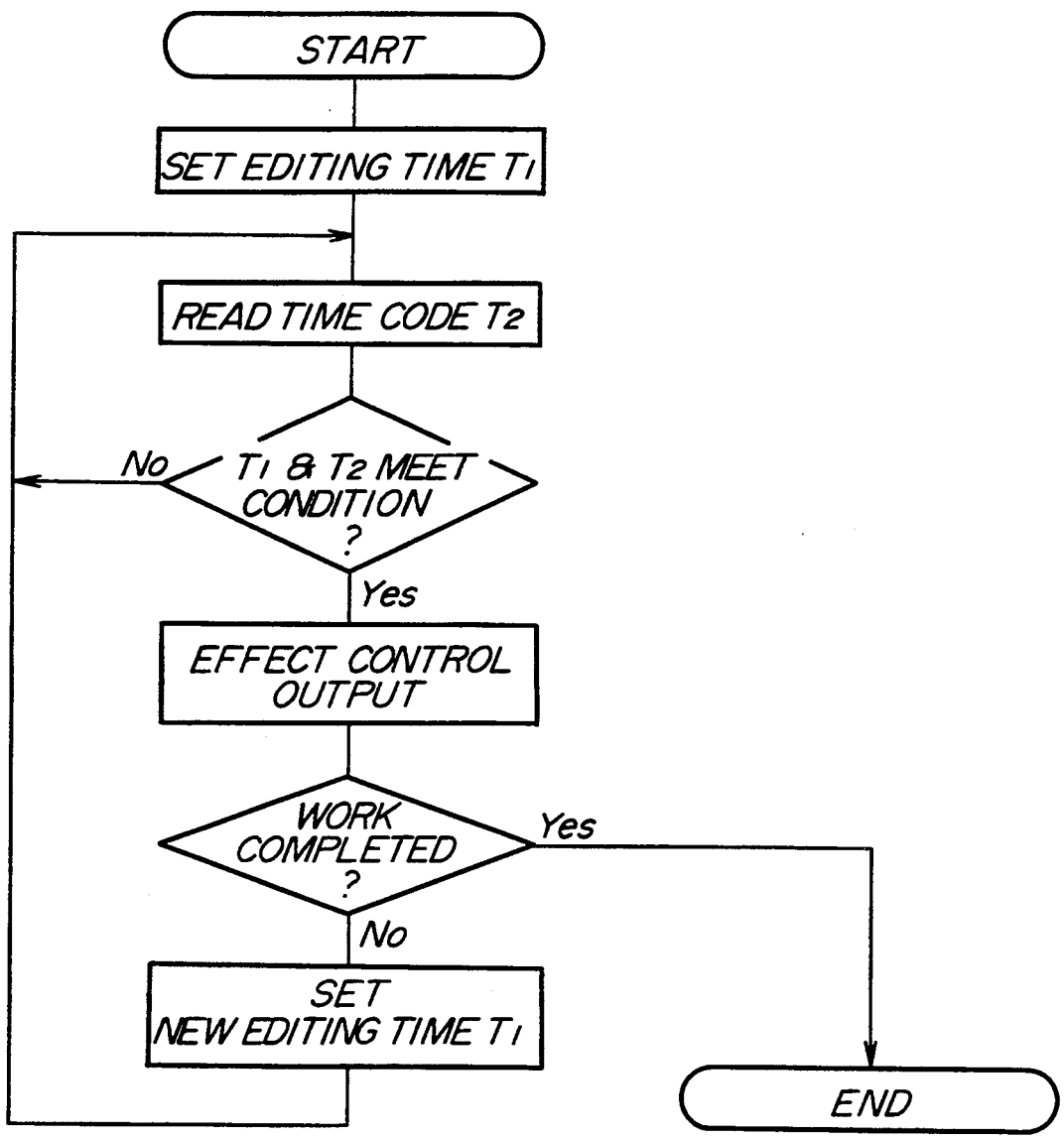
FIG. 2 is a flowchart of steps performed by the prior art apparatus.
Figure 3:
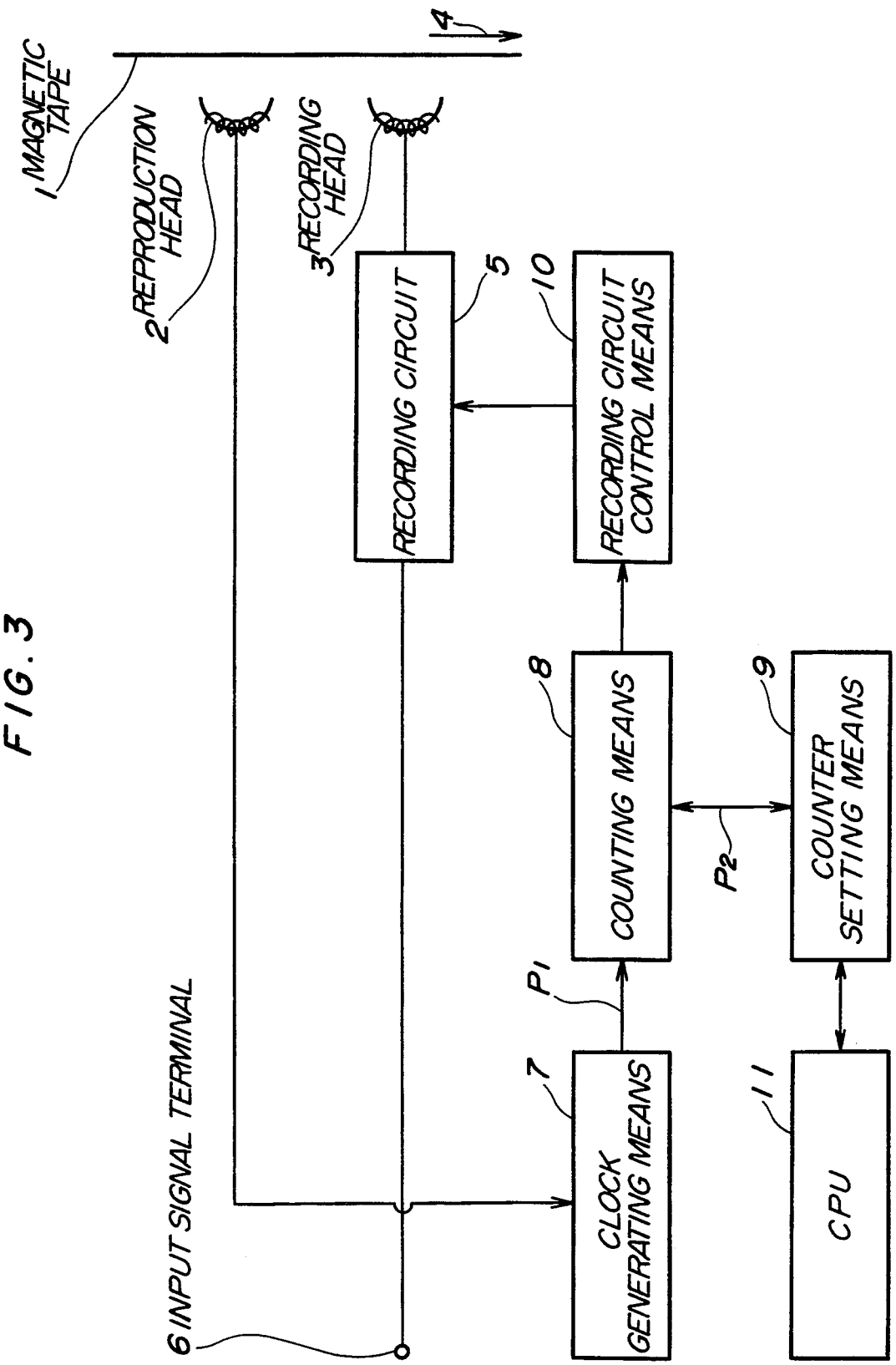
FIG. 3 is a circuit block diagram of a recording control apparatus embodying the present invention.

FIG. 3 is a block diagram of one preferred embodiment of the invention. In FIG. 3, a magnetic tape 1 runs in an arrowed direction 4 with respect to a reproduction head 2 and a recording head 3 disposed a certain distance apart. The reproduction head 2 reproduces a time code from the magnetic tape 1. A recording circuit 5 causes the recording head 3 to record onto the magnetic tape 1 the signals coming from an input signal terminal 6. Out of the time code signal reproduced by the reproduction head 2 from the magnetic tape 1, a clock generating means 7 generates timing clock pulses in synchronism with the time code. A counting means 8 counts the timing clock pulses. The counting means 8 is illustratively composed of an eight-digit down counter. An initial value is set to the down counter. Starting from the initial value, the down counter counts it down in accordance with the timing clock pulses. A counter setting means 9 is supplied from a CPU 11 with the above initial value determined by a control program according to a counting start time and a mode change time. The counter setting means 9 sets the initial value to the counting means 8. A recording circuit control means 10 activates or deactivates the recording circuit 5 in accordance with a counting end signal from the counting means 8.

Figure 4:
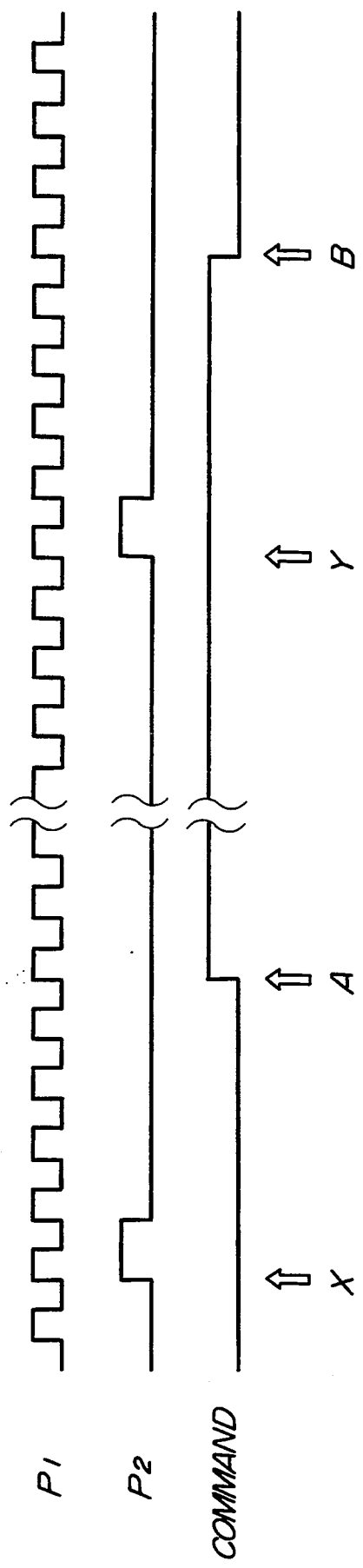
FIG. 4 is a timing chart in effect when the embodiment of FIG. 3 is in operation.
Figure 5:
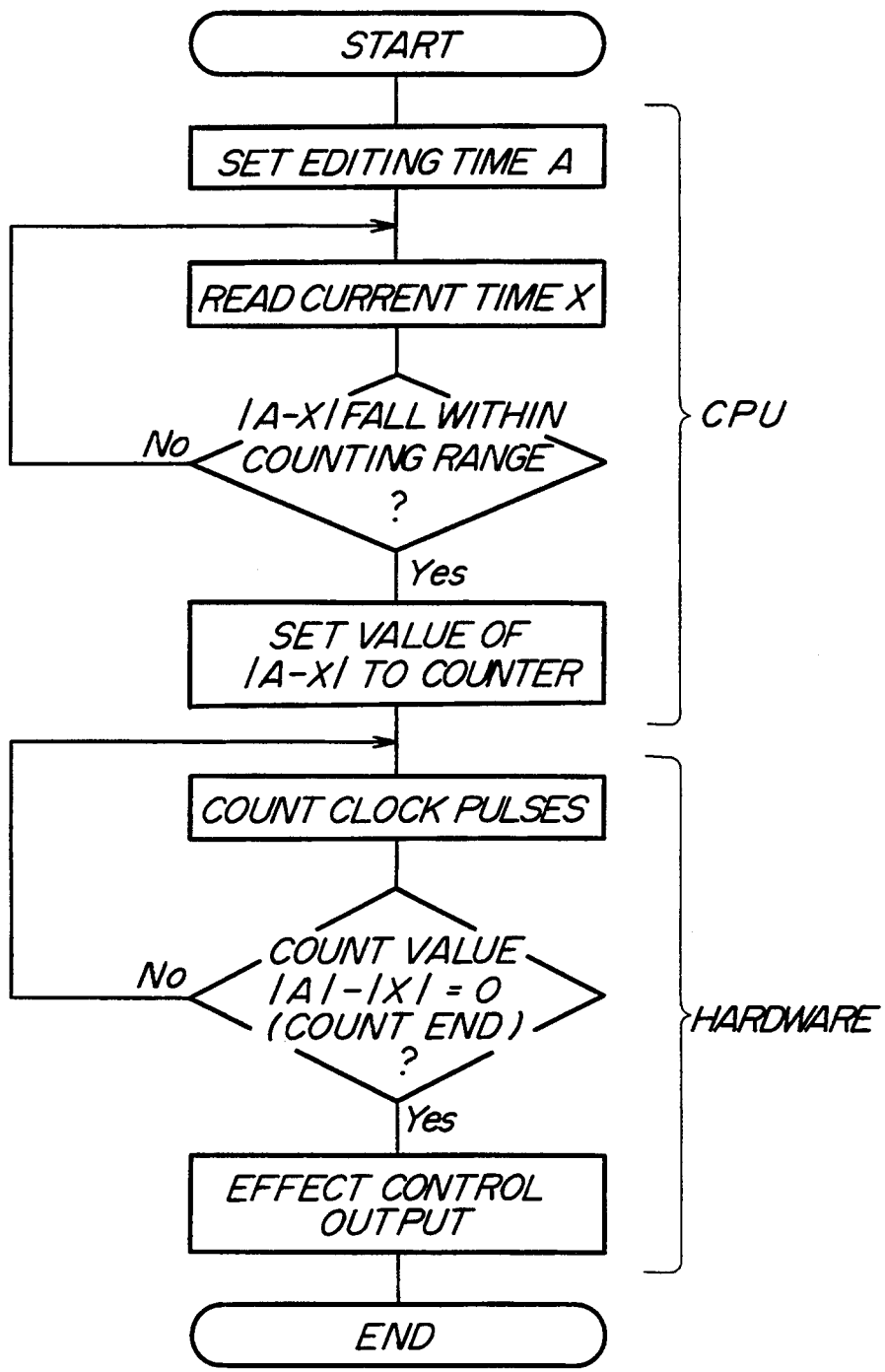
FIG. 5 is a flowchart of steps carried out by the same embodiment.

How the apparatus of the above-described construction works will now be described with reference to FIGS. 4 and 5. The reproduction head 2 reproduces the time code from the magnetic tape 1. The time code contains information about absolute positions on the magnetic tape 1. Based on the time code signal, clock generating means 7 generates clock pulses $P_1$ in synchronism with the time code. The counting means 8 counts the clock pulses $P_1$ from the clock generating means 7. When the counting by the counting means 8 ends is determined by the initial value set by the counter setting means 9. The recording circuit control means 10 activates or deactivates the recording circuit 5 according to the output from the counting means 8.

In an example, recording is started on the magnetic tape 1 at a time A and stopped at a time B. The clock pulses $P_1$ are in synchronism with the time code, the latter containing time-related information. Thus the times A and B have specific positions on a clock pulse train, as illustrated in FIG. 4. When the recording start time A is determined, the control program causes the CPU 11 to set a pulse count to the counter setting means 9 at the counting start time X, the pulse count having being determined according to and between the counting start time X and the recording start time A. In turn, the pulse count is set to the counting means 8. The counting start time X need only meet two conditions: that the time x is to be established chronologically before the recording start time A, and that the time X is to fall within a range that may be counted by the counting means 8. The counting means 8 starts counting clock pulses from the counting start time X. When the time A is reached, the counting means 8 stops its counting. With counting completed by the counting means 8, the recording circuit control means 10 activates the recording circuit 5.

When the recording end time B is determined, the control program causes the CPU 11 to set to the counter setting means 9 a pulse count at a counting start time Y, the pulse count having being determined according to and between the counting start time Y and the recording end time B. In turn, the pulse count is set to the counting means 8. The counting means 8 starts counting pulses at the time Y and stops the counting when the time B is reached. With the counting means 8 having ended its counting, the recording circuit control means 10 deactivates the recording circuit 5.

In the above-described construction, the recording start time A and the recording end time B are controlled by the clock generating means 7 and counting means 8 alone once the counting means 8 is set by the counter setting means 9. That is, the microprocessor and its control program for controlling the entire system in FIG. 3 need not be concerned with control over the times A and B. The burdens on the microprocessor and its control program are thus alleviated, and the recording circuit 5 is controlled to act at the exact tape positions required.

The invention as embodied above may have other variations and modifications. For example, in FIG. 3, the clock generating means 7 generates the clock pulses out of the time code reproduced by the reproduction head 2. However, what is essentially needed here is to generate clock pulses that correspond exactly to the positions on the magnetic tape 1. Thus an alternative to the above arrangement is to generate clock pulses from revolution pulses of a tachometer roller that rotates in keeping with the running magnetic tape 1. This makes it possible to edit a magnetic tape with no time code recorded on it.

Figure 6:
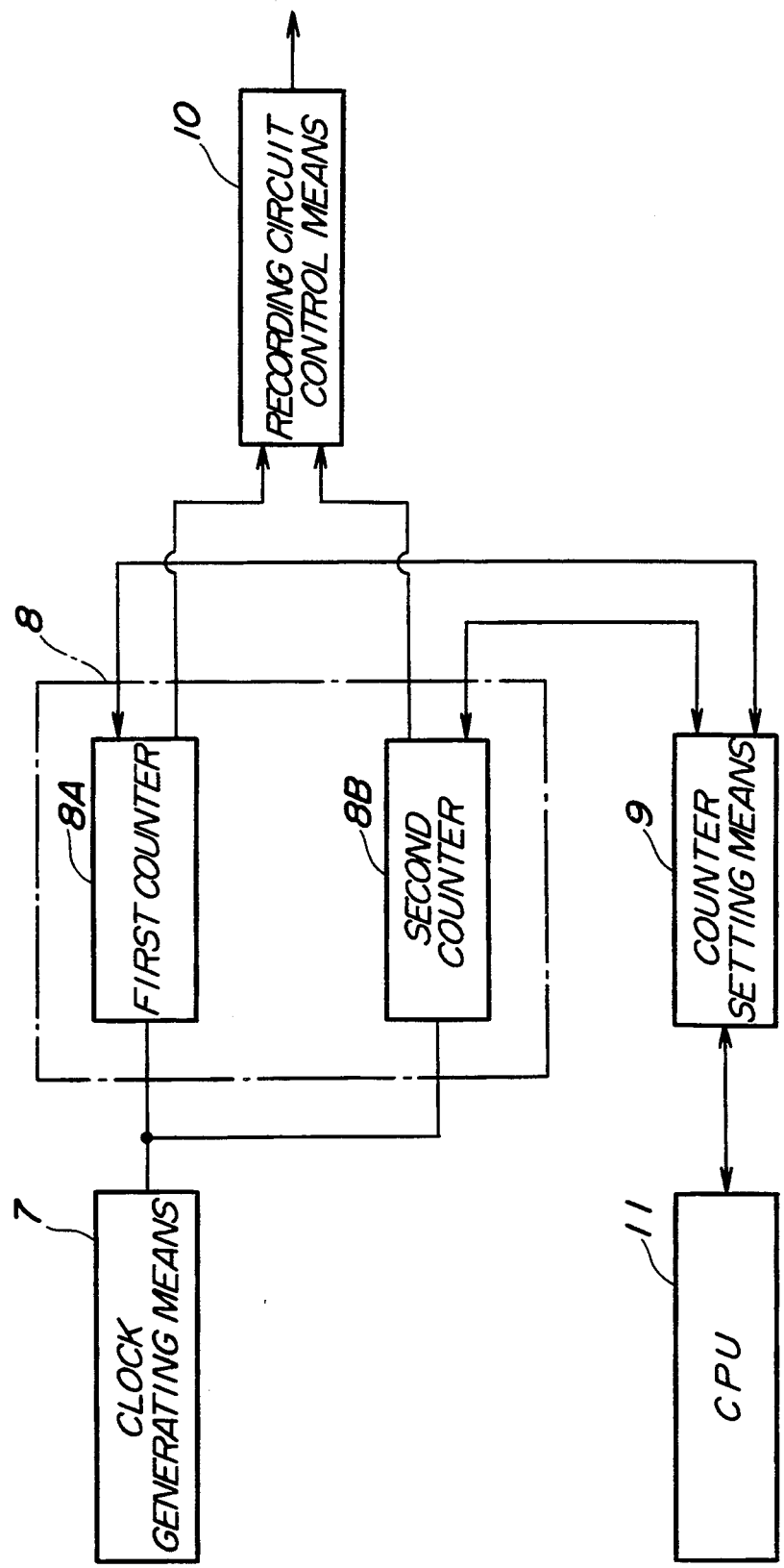
FIG. 6 is a circuit block diagram of a variation of the embodiment.
Figure 7:
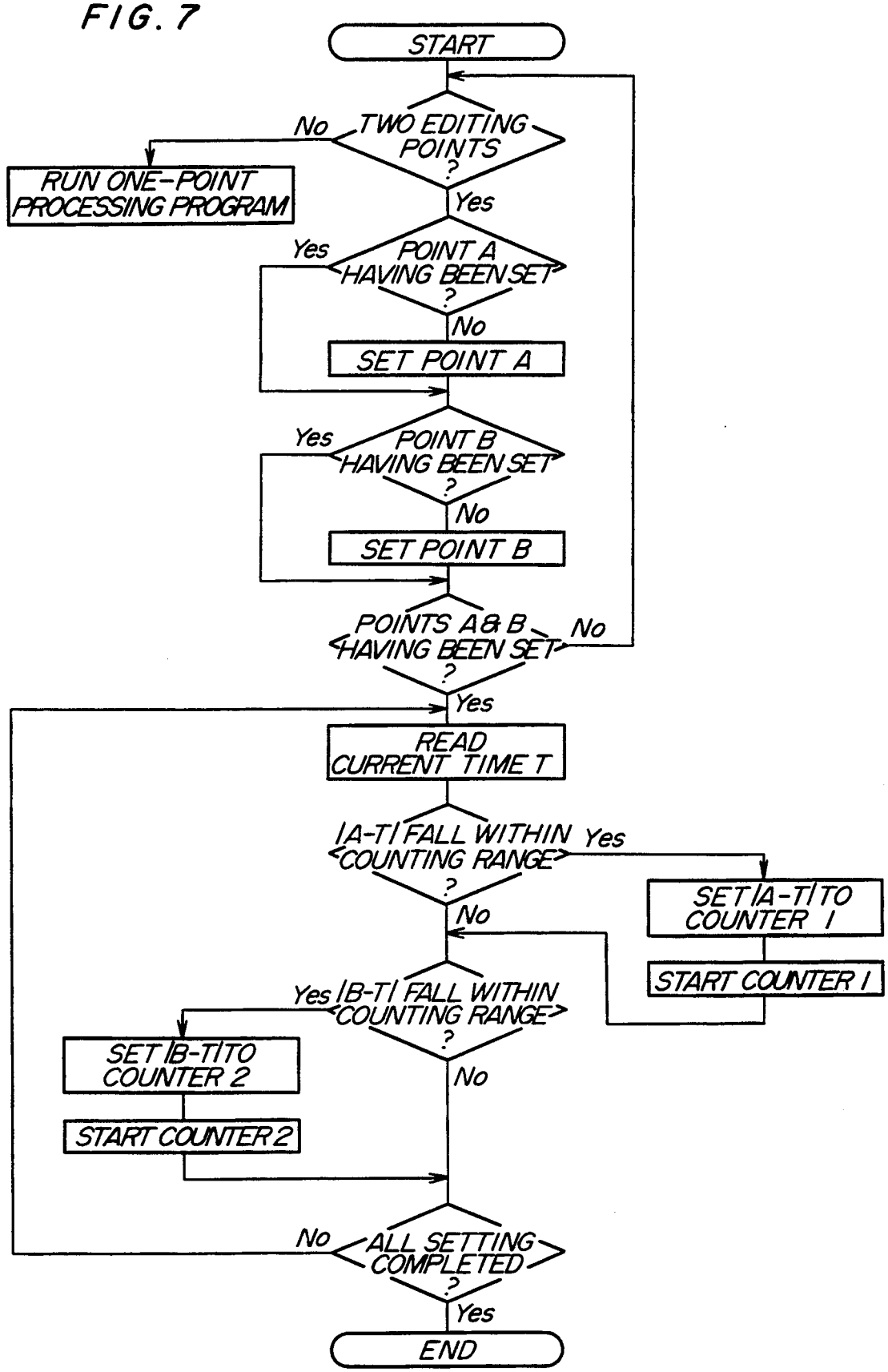
FIG. 7 is a flowchart of steps executed by the variation of FIG. 6.

The counting means 8 of FIG. 3 may be alternatively composed of two counters, i.e., a first counter 8A and a second counter 8B, as shown in FIG. 6. The arrangement of FIG. 6 first checks to see, as depicted in the flowchart of FIG. 7, whether there is one or two editing points. If two editing points are found to exist, each of the points A and B is set successively. Then with respect to the current time T, values $|A-T|$ and $|B-T|$ are set to the first and the second counters, respectively, as initial values. That is, the counter setting means 9 separately sets the initial values to the first and the second counters 8A and 8B. The recording start position A is set in the first counter 8A, and the recording end position B is set in the second counter 8B. Because the first and the second counters 8A and 8B of the above construction carry out their counting independently of each other, the tape stretches to be counted may overlap with each other. This makes it possible to edit very short stretches of the magnetic tape.

As described, the invention when implemented provides a recording control apparatus of relatively simple structure to control the recording circuit in tape editing. According to the invention, the control program need not monitor the current tape position, the recording start position or the recording end position once it sets an initial value to the counting means. As a result, the burdens on the control program are alleviated, and the tape is edited with precise timing. In this manner, the recording control apparatus permits editing at precise positions on the tape and provides partial editing over very short stretches of the tape.

As many apparently different embodiments of the present invention may be made without departing from the spirit and scope thereof, it is to be understood that the invention is not limited to the specific embodiments thereof except as defined in the appended claims.

What is claimed is:

1. A recording control apparatus for use with a tape recorder having a recording head and a reproduction head for editing information on a recording tape, comprising:

a recording circuit selectively activated to provide recording information to said recording head;

a clock generating means for generating clock pulses that provide the basis for controlling said recording circuit, said clock pulses being detected from said recording tape by said reproduction head;

a counting means for counting said clock pulses beginning with a predetermined value, said counting means including a first counter and a second counter;

a counter setting means for providing said predetermined value to said counting means, said counter setting means setting a first initial value to said first counter and a second initial value to said second counter;

a recording circuit control means for controlling said recording circuit in accordance with an output of said counting means, said recording circuit control means leaving a first state of editing and entering a second state of editing when said first counter ends its counting, said recording circuit control means conversely leaving said second state and returning to said first state when said second counter ends its counting after said first counter; and a control means for generating said predetermined value and supplying said predetermined value to said counter setting means so that a start time and a stop time for recording said information on said recording tape are controlled by said predetermined value.

2. A recording control apparatus according to claim 1, wherein said clock generating means generates said clock pulses based on a time code reproduced from said recording tape.

3. A recording control apparatus according to claim 1, wherein said first state is a recording deactivating state and said second state is a recording activating state.

4. A recording control apparatus according to claim 1, wherein said first initial value determines a length of time for said first counter to generate a count end signal to start said recording and said second initial value determines a length of time for said second counter to generate a count end signal to stop said recording.

* * * * *